E. J. GULICK.
GEAR TRANSMISSION MECHANISM FOR AUTOMOBILES.
APPLICATION FILED AUG. 15, 1907.
923,044.
Patented May 25, 1909.
3 SHEETS—SHEET 1.
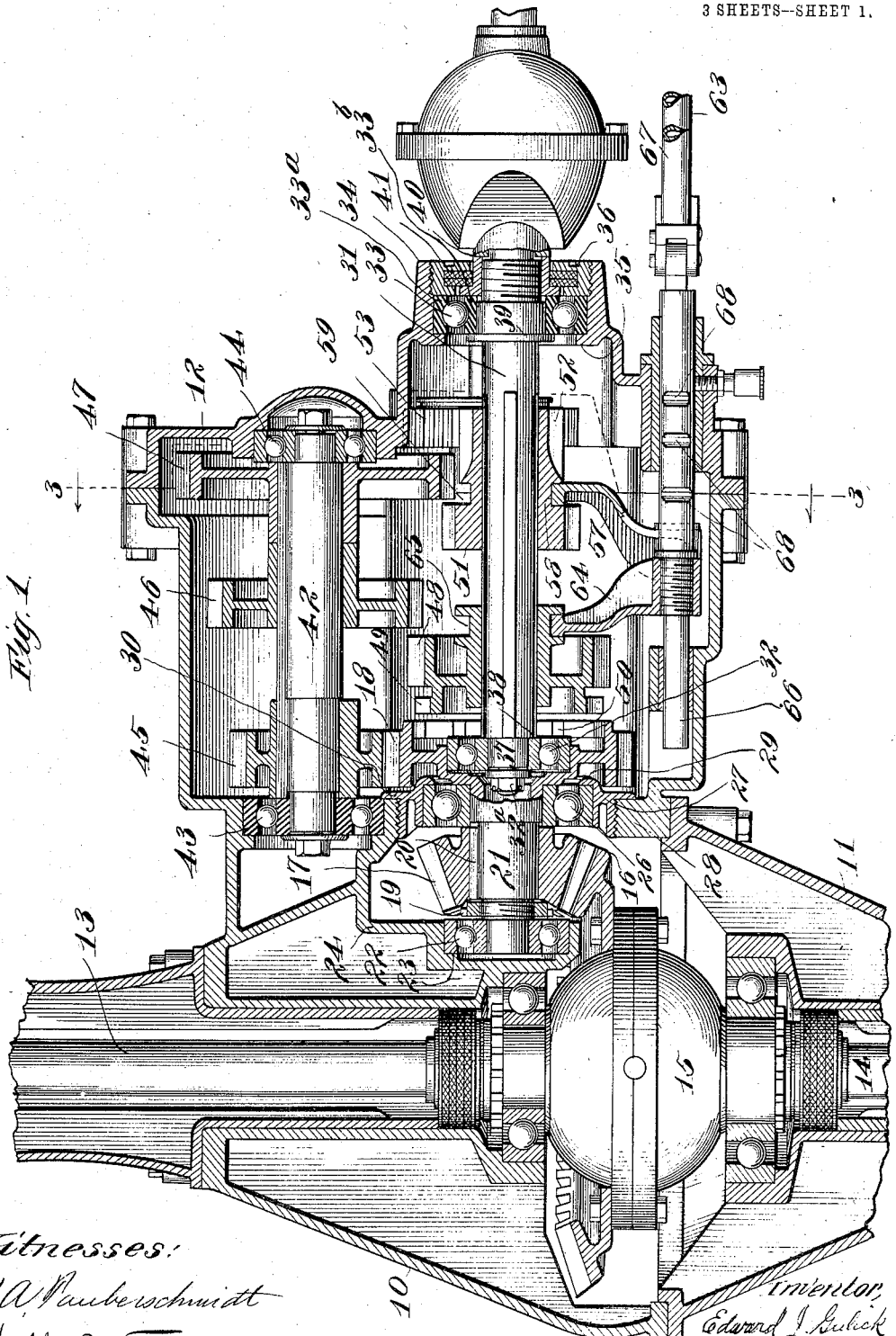
Witnesses:
G. A. Tauberschmidt
Walter M. Fuller
Inventor,
Edward J. Gulick
By Offield Towle & Linthicum
Attys E. J. GULICK.
GEAR TRANSMISSION MECHANISM FOR AUTOMOBILES.
APPLICATION FILED AUG. 15, 1907.
923,044.
Patented May 25, 1909.
3 SHEETS—SHEET 2.
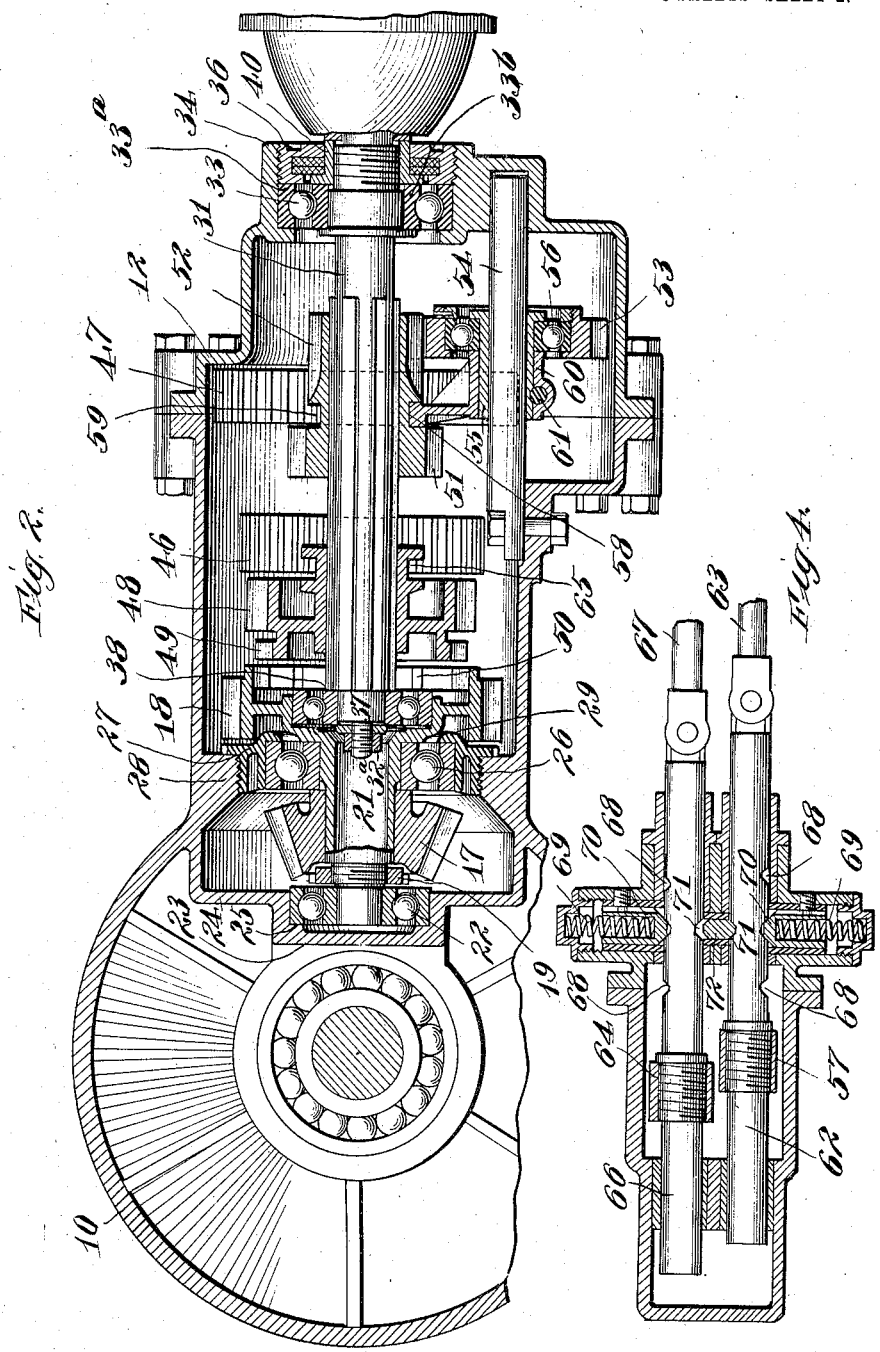

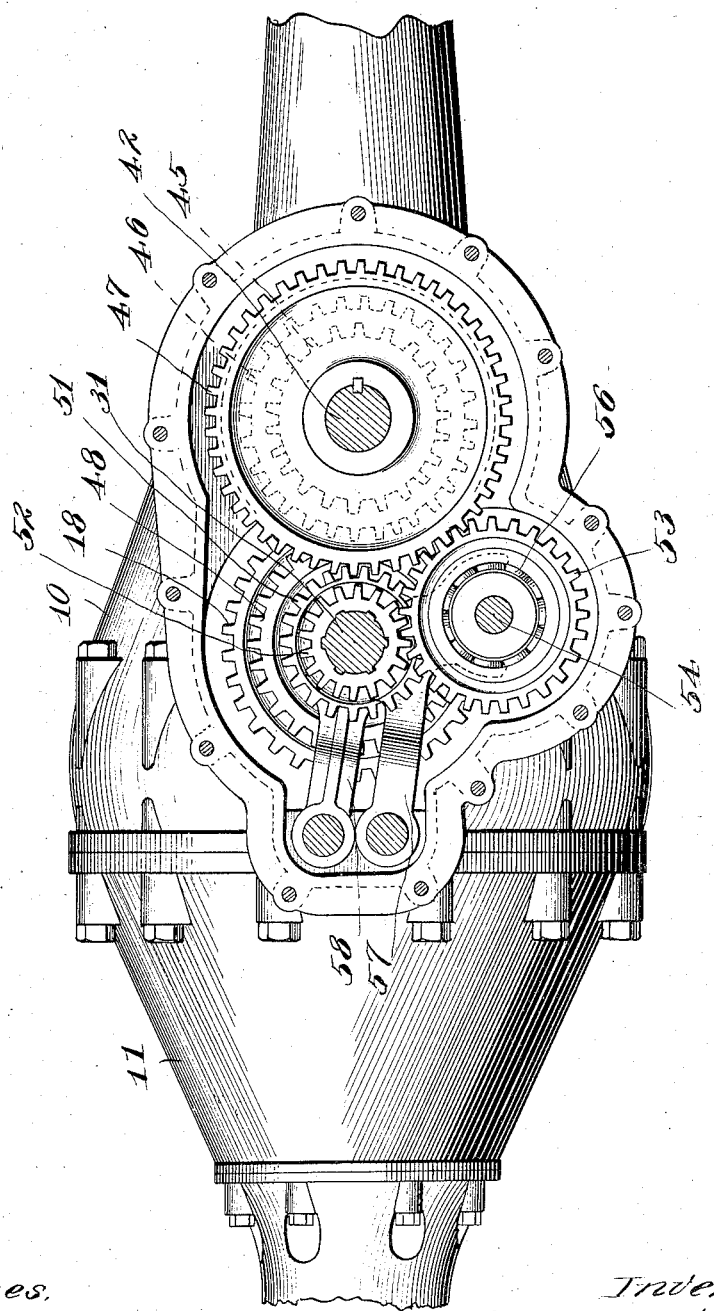

UNITED STATES PATENT OFFICE.

EDWARD J. GULICK, OF MISHAWAKA, INDIANA.

GEAR-TRANSMISSION MECHANISM FOR AUTOMOBILES.

No. 923,044.  Specification of Letters Patent.  Patented May 25, 1909.

Application filed August 15, 1907. Serial No. 388,665.

*To all whom it may concern:*

Be it known that I, EDWARD J. GULICK, a citizen of the United States, residing at Mishawaka, in the county of St. Joseph and State of Indiana, have invented certain new and useful Improvements in Gear-Transmission Mechanisms for Automobiles, of which the following is a specification.

My invention concerns improvements in the speed changing and transmission gearing of a motor-vehicle, in the manner of non-adjustably mounting the parts in an inclosing or housing casing, in the provision of a single controlling means for actuating the first speed and reverse gears, and a single controlling mechanism for operating the second and third speed gears, and in means for interlocking the controllers for the gears to positively prevent the throwing of more than one into operation at a time.

On the accompanying drawings, forming a part of this specification, I have illustrated my preferred embodiment of the invention, like reference characters referring to the same parts in all the views.

Figure 1 is a horizontal section through the gearing and its casing of an automobile; Fig. 2 is a substantially central longitudinal vertical section of the construction shown in Fig. 1; Fig. 3 is a vertical cross-section on line 3—3 of Fig. 1 as viewed in the direction indicated by the arrows; and Fig. 4 is a vertical section through a portion of the casing illustrating the means for locking the sliding controlling rods governing the operation of the gears.

The gearing is inclosed in a three-part casing the three parts of which are characterized 10, 11 and 12 on the drawing. The companion sections 13 and 14 of the divided rear axle are connected together by differential gearing inclosed in the rotary casing or box 15 to which is bolted a bevel gear 16, the teeth of which mesh with those of a bevel pinion 17 disposed on the hollow hub of a spur gear 18. Gear 17 is held firmly on the hub 21 of gear 18 by a nut 19, the two gears being compelled to rotate together by the key or spline 20 between gear 17 and the hub. The inner end of the hub 21 of gear 18 is equipped with a ball bearing 22 located in a circular recess 23 in an internal wall 24 of the part 10 of the inclosing housing. The ball bearing rests against a circular shoulder 25 in the recess, as is clearly illustrated. Between the gears 17 and 18 hub 21 has a ball bearing 26 located inside of a sleeve or bushing 27 screw-threaded in the transverse wall 28 of the casing. Bushing or sleeve 27, as is illustrated, has an inwardly-extended circular flange 29 bearing against the ball bearing, and an outwardly-extended flange 30 adapted to bear against one face of wall 28 of the casing. It is obvious, therefore, that the gears 17 and 18 and their bearings are non-adjustably maintained in position. The device is also supplied with a driving shaft 31 having at its inner end a ball bearing 32 located within gear 18 and having a radial bearing only in gear 18. Bearing 32 is rigidly secured to the reduced end 37 of shaft 31 by a nut $32^a$, and there is no endwise bearing or thrust of any part against gear 18. The outer end of shaft 31 is supplied with a ball bearing 33 within a contracted neck 34 of the part 12 of the casing and all of the end thrust of shaft 31 is taken up by the ball bearing 33, one side of the outer race $33^a$ of which abuts against a circular inwardly-extended shoulder 35 integral with the casing neck 34. The end thrust of the shaft in one direction is borne by this shoulder, while the thrust in the opposite direction is borne by a threaded ring 36 screwed into the neck 34 solidly against the outer race or track $33^a$ of the ball bearing 33. The inner race $33^b$ of bearing 33 is held rigidly against collar 39 integral with the shaft 31 by a sleeve 40 which is screw threaded on to the shaft. One or more felt washers 41 may be interposed between sleeve 40 and nut 36 if desired. It is apparent, therefore, that bearing 32 being secured to the end of shaft 31, as explained, and not bearing endwise against gear 18, the latter will carry the radial load only of shaft 31, and the bearing 33 which is rigidly secured to shaft 31 will carry the radial load and also the endwise thrust loads in both directions. The object of this construction is to relieve gear 18 and bearings 22 and 26 from any end thrust from shaft 31. A second shaft 42 is rotatably mounted in the casing parallel to the driving shaft 31 and is supplied at its ends with ball bearings 43 and 44. Keyed to this shaft are three spur gears 45, 46 and 47 of different diameters, the teeth of gear 45 being in constant mesh with the teeth of gear 18.

On the shaft 31 and splined thereto so as to be rotatable therewith but slidable longitudinally thereof, I mount a spur gear 48 which has at one end a clutch element provided with teeth 49 adapted to be slid into and out of operative relation with the internal clutch teeth 50 of gear 18. When the gear 48 is slid toward the rear axle, the clutch elements 49 and 50 are brought into active relation so that the rotation of the driving shaft 31 is transmitted directly to the gears 18 and 17 and the highest speed secured. When the gear 48 is slid in the opposite direction its teeth are brought into mesh with those of gear 46 on shaft 42, producing a slower speed.

Splined on the shaft 31 and movable longitudinally thereof is a smaller spur gear 51 adapted to be slid into and out of mesh with the gear 47, to produce the slowest forward speed. Integral with the gear 51 is a smaller gear 52, the teeth of which are constantly in mesh with a reverse gear 53 slidable on a rod 54 suitably mounted in the casing below shaft 31. When the gears 51 and 52 and the reverse gear 53 which travels with them are slid to the right, as viewed in Fig. 1, the gear 51 is brought into mesh with the gear 47, which provides the slowest forward speed of the vehicle. When these gears 51, 52 and 53 are slid in the opposite direction, the gear 53 being in constant mesh with the gear 52 is brought into mesh with the teeth of gear 47 so that the direction of the travel of the vehicle is reversed.

Gear 53 is mounted on a sleeve or bushing 55 slidable on a rod 54, and has interposed between it and the sleeve a ball bearing 56. In order to slide the gears 51, 52 and 53 simultaneously I provide an arm 57 which has a bifurcated end 58 fitted in a groove 59 of the combination gear 51—52. This arm 57 also has a split portion 60 which surrounds the sleeve 55 and is bound thereto by a bolt or screw 61. At its opposite end the arm 57 is screw threaded onto a rod 62 slidably mounted in the casing and connected at one end by a link or connecting rod 63 to an operating handle. A similar arm 64 engages the slot 65 of gear 48 and has a similar screw threaded connection with a rod 66 slidable in the casing, parallel to and above the rod 62. A like connecting rod or link 67 joins the rod 66 to another operating handle. Each rod on one face has three beveled notches 68 into which may be projected by means of a spring 69 a beveled locking pin 70 to hold the rod and the parts actuated thereby in operative or neutral position. Each rod is notched at 71 on its face adjacent to its other rod, each recess 71 having beveled or inclined faces, as indicated. Suitably mounted and vertically slidable in the casing is a locking pin 72 having its ends oppositely inclined or beveled and adapted to fit in the recesses 71. When the rods are in their neutral position, that is when none of the gears controlled thereby are operative, the notches 71 are opposite the locking pin 72, as indicated in Fig. 4, which then fits in the recess 71 of the lower rod 62, due to gravity. If the upper rod 66 is moved so as to throw the gear 48 into mesh with the gear 46 or to throw the two clutch elements 49 and 50 together, an unnotched portion of the rod is brought over the top end of pin 72 so that it is impossible to slide the lower rod 62 until the upper rod has again been brought to neutral position. When the upper rod is in this position the lower rod may be shifted, and as soon as it is moved, owing to the co-operation of the beveled faces of the notch 71 and the locking pin 72, the latter is pushed upwardly into the notch of rod 66, thereby holding the latter from movement as long as the lower rod is displaced from neutral position. If the rods 62 and 66 were in the same horizontal plane, the locking pin would act in substantially the same manner, that is movement of one rod would project the opposite end of the pin into the recess of the other rod to hold the same from sliding.

Although I have described in detail my improved construction, it is to be understood that my invention is not limited to the precise structural features shown and described, but that the details of the device may be varied considerably without departure from the substance of my invention.

On the accompanying drawings I have illustrated features which form the subject matter of a co-pending patent application.

I claim:

1. In a motor-vehicle, the combination of a driving shaft, a second shaft, a gear on said second shaft, a second gear on said driving shaft adapted to be moved into and out of mesh with said first mentioned gear, a third gear on said driving shaft and movable with said second gear, a reverse gear in constant mesh with said third gear, and a single controller to throw said second or reverse gears into and out of mesh with said first mentioned gear, substantially as described.

2. In a motor-vehicle, the combination of a rotary driving shaft, a second shaft, a gear fixed to and rotatable with said second shaft, a second gear rotatable with said driving shaft and slidable thereon into and out of mesh with said first mentioned gear, a third gear on said driving shaft movable with said second gear, a sliding reverse gear in constant mesh with said third gear, and a single controller to slide said second, third and reverse gears so as to throw the former and latter into and out of mesh with said first mentioned gear, substantially as described.

3. In a motor-vehicle, the combination of a gear, a second gear fixed to and rotatable with said first gear, an inclosing casing, bearings for said gears in said casing, bearing confining members having shoulders coöperating with said bearings to maintain them in place, a rotary driving shaft, gears slidable thereon, a bearing for said driving shaft in said first gear, and a non-adjustable bearing for said driving shaft, substantially as described.

4. In a motor-vehicle, the combination of a pair of gears rigidly fastened together, an inclosing casing, a pair of non-adjustable ball-bearings for said gears, a driving shaft, a non-adjustable ball-bearing for said shaft, in one of said gears, and another non-adjustable ball-bearing for said driving shaft in said casing, substantially as described.

5. In a motor-vehicle, the combination of an inclosing casing, a gear rotatably mounted in said casing, a driving shaft, means to transmit the rotation of said driving shaft to said gear, a bearing for said driving shaft in said casing, means to transmit the endwise thrusts of said driving shaft in both directions through said bearing to said casing, and a bearing for said driving shaft in said gear, whereby said gear receives none of the longitudinal thrusts of the driving shaft, substantially as described.

EDWARD J. GULICK.

Witnesses:
FREDERICK C. GOODWIN,
WALTER M. FULLER.